March 12, 1968     O. BARTHRUFF     3,372,420
WINDSHIELD WIPER ASSEMBLY FOR AUTOMOTIVE VEHICLES
Filed Oct. 21, 1965     3 Sheets-Sheet 1

INVENTOR
Otto Barthruff
by Michael S. Striker
Attorney

March 12, 1968  O. BARTHRUFF  3,372,420
WINDSHIELD WIPER ASSEMBLY FOR AUTOMOTIVE VEHICLES
Filed Oct. 21, 1965  3 Sheets-Sheet 3

INVENTOR
Otto Barthruff
by Michael S. Striker
Attorney

United States Patent Office 3,372,420
Patented Mar. 12, 1968

3,372,420
WINDSHIELD WIPER ASSEMBLY FOR AUTOMOTIVE VEHICLES
Otto Barthruff, Stuttgart, Germany, assignor to Robert Bosch, Stuttgart, Germany
Filed Oct. 21, 1965, Ser. No. 500,003
Claims priority, application Germany, Nov. 20, 1964, B 79,417
12 Claims. (Cl. 15—250.17)

ABSTRACT OF THE DISCLOSURE

A windshield wiper assembly wherein the blade is rigid with a crank arm which is rockable about a fixed axis. An electric motor reciprocates a pusher which has a slot for a pin of the crank arm. A pawl is mounted on the pusher and can be moved into or from engagement with the pin so that the latter rocks the crank arm when it is engaged by the pawl.

---

The present invention relates to windshield wiper assemblies for automotive vehicles. More particularly, the invention relates to a novel coupling device which may establish a driving connection between the prime mover and the wiper blade of a windshield wiper assembly.

It is an important object of the invention to provide the windshield wiper assembly with a coupling device which allows the motor of the prime mover to run without transmitting motion to the wiper blade so that the blade may be started after the motor is set in operation.

Another object of the invention is to provide an assembly of the just outlined characteristics wherein the transmission of motion to the blade in response to activation of the coupling device takes place smoothly and wherein the coupling device may be activated or disconnected by exertion of a minimal force.

An additional object of the invention is to provide a windshield wiper assembly wherein the coupling device for the wiper blade is mounted externally of the prime mover, wherein such coupling device consists of a minimal number of simple and inexpensive parts, and wherein the coupling device may be activated in automatic response to starting of the prime mover but with a desired delay.

A concomitant object of the invention is to provide a coupling device which can be utilized to insure that one of two wiper blades which sweep overlapping areas of the windshield may be automatically delayed to such an extent that the wiper blades cannot interfere with each other.

A further object of the invention is to provide a coupling device which insures that the wiper blade which receives motion therefrom invariably comes to a halt in such end position in which it cannot obstruct the vision of a driver.

Another object of the instant invention is to provide a coupling device which need not include gears, wheels, sprockets or similar costly and precision-finished parts, and which occupies a minimum of space.

An additional object of the invention is to provide a windshield wiper assembly which embodies a coupling device of the above outlined characteristics and which is constructed and assembled in such a way that each of its blades which are movable between inner and outer end positions invariably comes to a halt in its outer end position in automatic response to idling of the prime mover.

Briefly stated, one feature of my present invention resides in the provision of a windshield wiper assembly for automotive vehicles which comprises a wiper blade having a wiper arm rockable about a fixed axis, a crank arm drivingly connected with the wiper arm and rockable about the fixed axis to thereby rock the wiper blade between two angularly spaced end positions, a prime mover which preferably includes an electric motor, and a novel coupling device for selectively connecting the prime mover with the crank arm. In accordance with the invention, the coupling device is located externally of the prime mover and includes a reciprocable element in the form of a pusher or link which is operatively connected with the rotary output element of the prime mover and is provided with an elongated slot, a pin or an analogous projection provided on the crank arm and reciprocably extending into the slot of the pusher, a pawl or another suitable motion transmitting member mounted on the pusher for movement between an operative position in which it engages the projection of the crank arm to thereby couple the crank arm to the pusher whereby the crank arm rocks about the fixed axis in response to reciprocation of the pusher when the prime mover is set in motion, and an inoperative position in which the projection of the crank arm is free to slide in the slot of the pusher so that the pusher may reciprocate with reference to the crank arm and an electromagnet or another suitable manually controlled disengaging device for moving the motion transmitting member to inoperative position.

The projection of the crank arm is arranged to temporarily move the motion transmitting member to inoperative position in response to movement of the pusher with reference to the crank arm and the projection thereon. The coupling device further comprises a torsion spring or an analogous member for permanently biasing the motion transmitting member to its operative position.

The novel features which are considered as characteristic of the invention are set forth in particular in the appended claims. The improved windshield wiper assembly itself, however, both as to its construction and the mode of manipulating the same, together with additional features and advantages thereof, will be best understood upon perusal of the following detailed description of a specific embodiment with reference to the accompanying drawings, in which:

Figure 1:
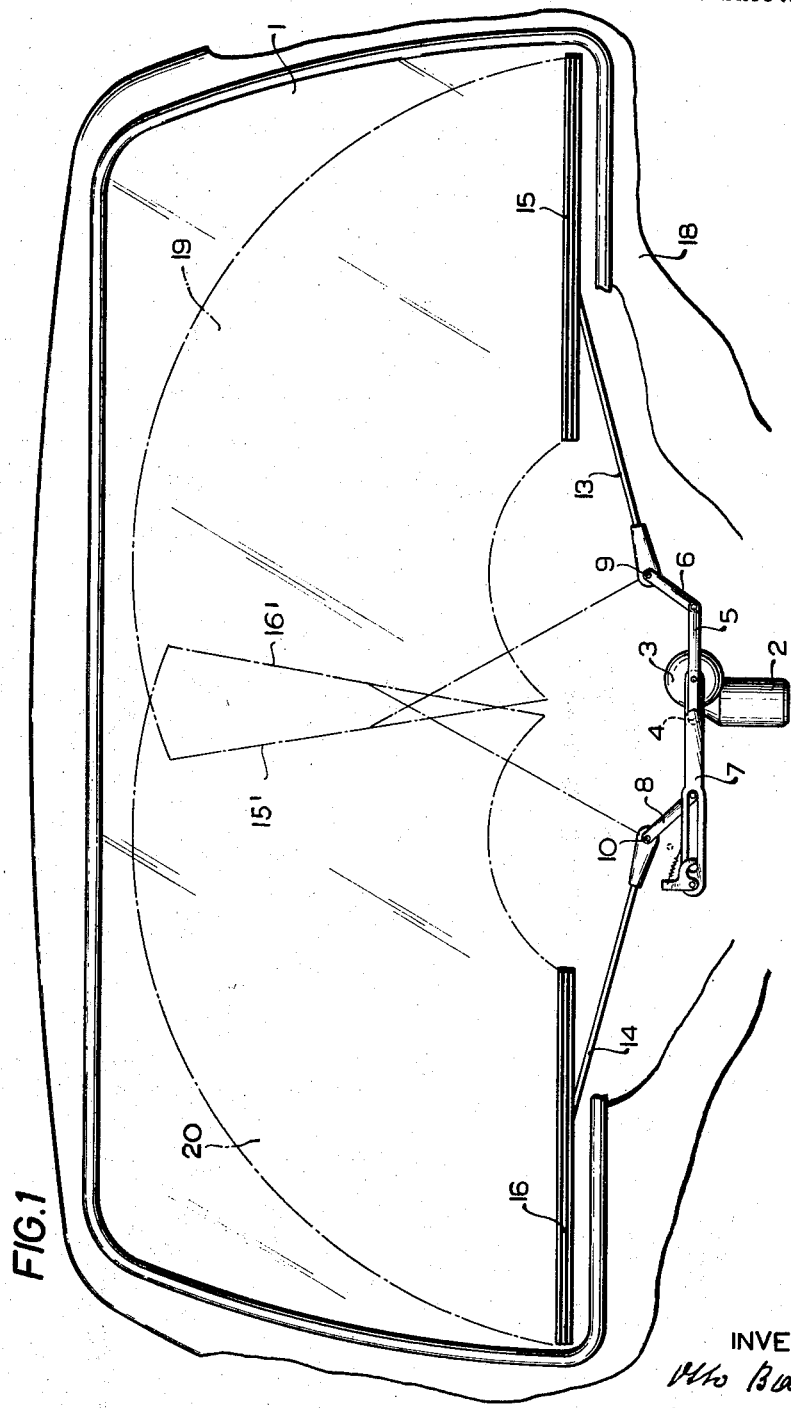
FIG. 1 is a somewhat schematic front elevational view of a windshield wiper assembly which embodies my invention.

Referring first to FIG. 1, the improved windshield wiper assembly is mounted in an automotive vehicle so that its wiper blades 15, 16 may sweep the windshield 1. The blades 15, 16 respectively comprise wiper arms 13, 14 which are rockable about the axes of two pivots 9, 10. The windshield wiper assembly further comprises a prime mover including an electric motor 2 and a transmission 3 having an output element in the form of an arm 4 which rotates about the axis of a shaft 3a (see FIG. 3) when the circuit of the motor 2 is completed. The free end of the arm 4 is coupled to a pair of reciprocable elements here shown as links or pushers 5, 7 which are articulately connected with crank arms 6, 8 respectively. The crank arm 6 is rigid with the arm 13 of the wiper blade 15 and is connected with the pusher 5 by means of a pivot pin 6a. The crank arm 8 is rigid with the arm 14 of the wiper blade 16. In other words, the arms 6 and 13 are fixed to the pivot 9 which is rotatable in a bearing sleeve 11 shown in FIG. 3, and the pivot 10 (which is rotatable in a bearing sleeve 12) is rigid with the arms 8 and 14. The motor 2 and the bearing sleeves 11, 12 are mounted on a supporting panel or plate 17 shown in FIGS. 2 and 3, and this panel 17 is secured to a dashboard 18. As shown in FIG. 3, each of the two bearing sleeves 11, 12 comprises a series of coaxial sections which serve to secure the panel 17 to the dashboard 18. The panel 17 carries all or nearly all component parts of the improved windshield wiper assembly which latter can be assembled independently and externally of the vehicle and can be rapidly attached to or disconnected from the dashboard 18.

When the motor 2 is started, the wiper blades 15, 16 should be rocked between their solid-line outer end positions, in which the two blades are preferably located in a common horizontal plane, and angularly spaced inner end positions 15', 16' which are indicated in FIG. 1 by phantom lines. The movements of the two wiper blades must be synchronized and the innermost portion of the area 19 swept by the blade 15 should overlap the innermost portion of the area 20 swept by the blade 16, or vice versa. In their inner end positions 15', 16' the wiper blades 15, 16 are nearly or almost nearly vertical. When the motor 2 is arrested, the two blades should assume their outer end positions which are indicated by solid lines.

In accordance with my invention, the operative connection between the transmission 3 and the crank arm 8 includes a novel coupling device which insures that wiper blade 16 cannot reach its inner end position simultaneously with the wiper blade 15 because, otherwise, the blade 15 would interfere with movement of the blade 16 for reasons which will be obvious by referring to FIG. 1 which shows that the area 19 partially overlaps the area 20. The coupling device is constructed and assembled in such a way that it begins to rock the blade 16 with a certain delay following movement of the blade 15 from the outer end position, preferably with such a delay that the blade 16 leaves its outer end position at the time when the blade 15 already assumes the inner end position 15'. Another function of the coupling device is to insure that, when the motor 2 is arrested, the two wiper blades invariably come to rest in their outer end positions so that the driver's field of vision through the windshield 1 is unobstructed.

Figure 2:
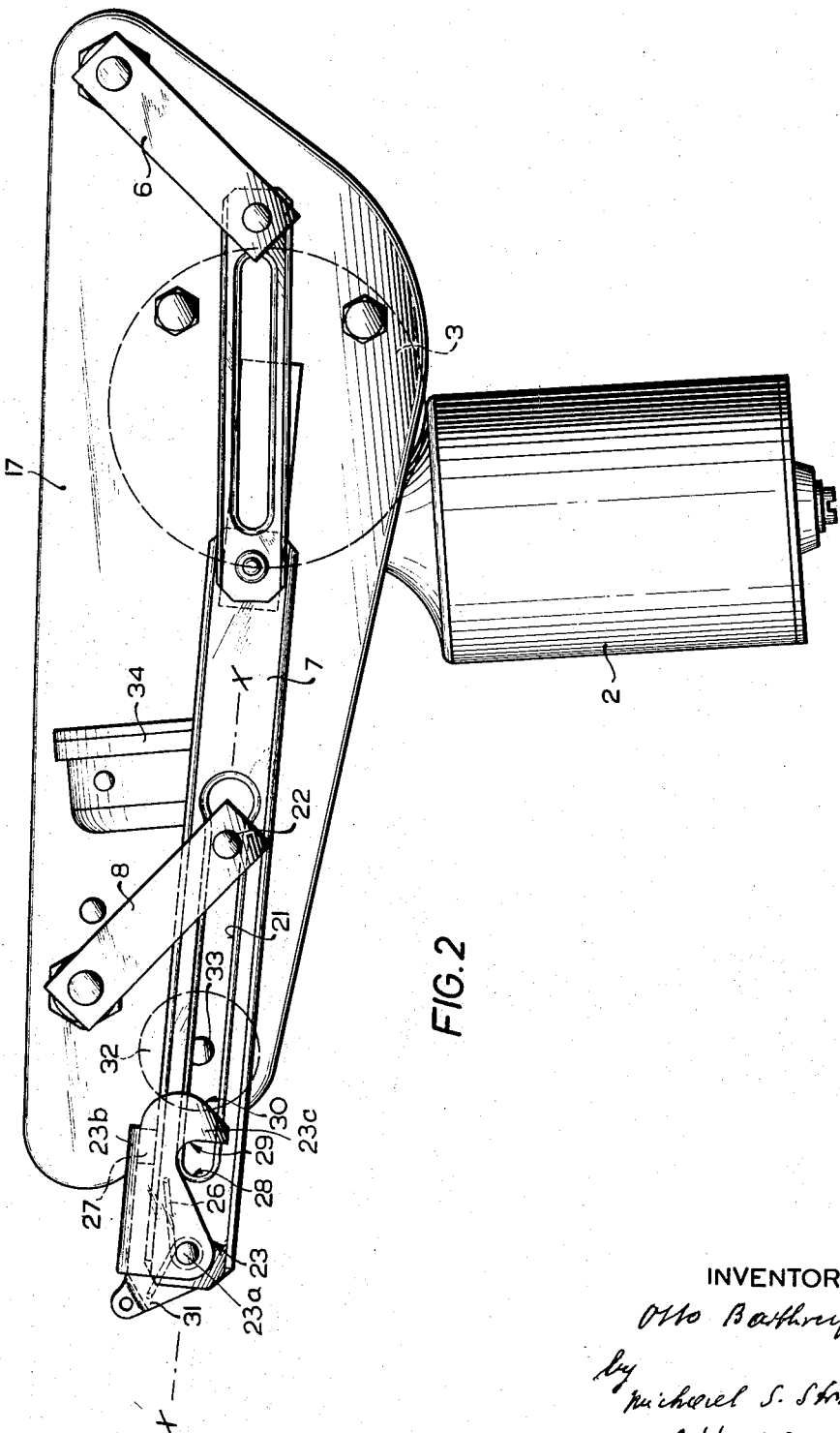
FIG. 2 is an enlarged fragmentary view of a detail of the assembly shown in FIG. 1.
Figure 3:
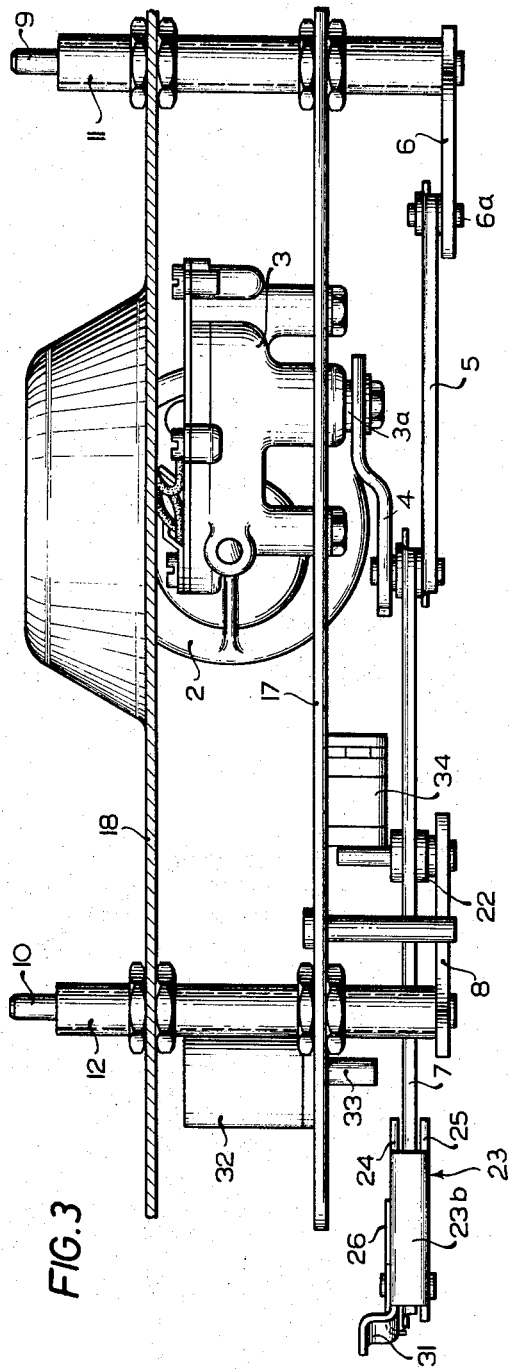
FIG. 3 is a top plan view of the structure shown in FIG. 2.

The coupling device comprises the aforementioned pusher or link 7 which is formed with a straight elongated slot 21 best shown in FIG. 2. This slot receives a projection in the form of a pin 22 which is secured to the free end of the crank arm 8. The left-hand end portion of the pusher 7 carries a motion transmitting member here shown as a pawl 23 which is rockable about the axis of a pin 23a. The axis of the pin 23a is located in a plane X—X which halves and extends lengthwise across the slot 21. The pawl 23 may be produced by deforming a suitably configurated blank of sheet metal and this pawl comprises two side walls or flanges 24, 25 which are adjacent to the opposite sides of the pusher 7. A torsion spring 26 which is coiled around the pin 23a tends to rock the pawl 23 in a clockwise direction, as they parts appear in FIG. 2, so that the transverse wall or web 23b of the pawl tends to abut against the upper edge face of the pusher 7. This web 23a carries a cushion or stop 27 which comes into actual abutment with the pusher 7 when the spring 26 is free to dissipate its energy. In the position of FIG. 2, the pallet or nose 23c of the pawl 23 overlies a portion of the slot 21 but provides sufficient room to accommodate the pin 22 between an internal end face 28 of the pusher 7 and the adjoining locking face 29 of the pallet 23c. The pallet 23c is further provided with an inclined cam face 30 which is engaged by the pin 22 during movement of the pusher 7 in a direction to the right, as viewed in FIG. 2, whereby the pin 22 overcomes the bias of the spring 26 and rocks the pawl 23 in a counterclockwise direction to such an extent that the pin may move into actual abutment with the internal end face 28. As soon as the pin 22 reaches the end face 28, the spring 26 returns the pawl 23 to the operative position shown in FIG. 2 whereby the pallet 23c couples the crank arm 8 to the pusher 7 and the crank arm begins to rock the pivot 10 and wiper arm 14 back and forth in response to further reciprocation of the pusher, i.e., in response to further operation of the motor 2. The cam face 30 may make with the plane X—X an angle of approximately 45 degrees. The pallet 23c actually comprises two sections or parts each of which is integral with one of the flanges 24, 25.

The pawl 23 is further provided with a trip 31 which cooperates with the actuating member of a manually controlled disengaging device serving to rock the pawl against the bias of the spring 26 at a time when the pin 22 is adjacent to the internal end face 28 of the pusher 7, i.e., to uncouple the crank arm 8 from the pusher 7 and to thus allow the wiper blade 16 to come to rest. The disengaging device comprises an electromagnet 32 which is mounted on the panel 17 and comprises a reciprocable actuating member or armature 33. The armature 33 is biased by a suitable spring (not shown) which tends to shift the armature to the outer end position shown in FIG. 3 in which this armature extends into the path of the trip 31. When the electromagnet 32 is energized, the armature 33 is retracted from the path of the trip 31 so that the pawl 23 may remain in the operative position shown in FIG. 3. The trip 31 can reach and can be rocked by the extended armature 33 only when the wiper arm 16 assumes the outer end position which is shown in FIG. 1 by solid lines. However, as soon as the pusher 7 begins to move in a direction to the left, i.e., toward the end position shown in FIG. 2, the trip 31 is disengaged from the extended armature 33 and the spring 26 is again free to rock the pawl 23 back to the operative position of FIG. 2 whereby the internal end face 28 moves away from the pin 22.

The panel 17 further supports a microswitch 34 whose movable contact 34a (see FIG. 4) extends into the path of the pin 22 on the crank arm 8 for the wiper blade 16. When the pusher 7 has completed its leftward stroke, as viewed in FIG. 2, and the wiper blade 16 assumes its outer end position, the movable contact 34a moves away from the fixed contact 34b of the microswitch 34 so that this switch opens. When the blade 16 leaves such outer end position, i.e., when the crank arm 8 is rocked in a clockwise direction as viewed in FIG. 2, a spring 34c moves the contact 34a against the contact 34b so that the microswitch 34 closes.

Figure 4:
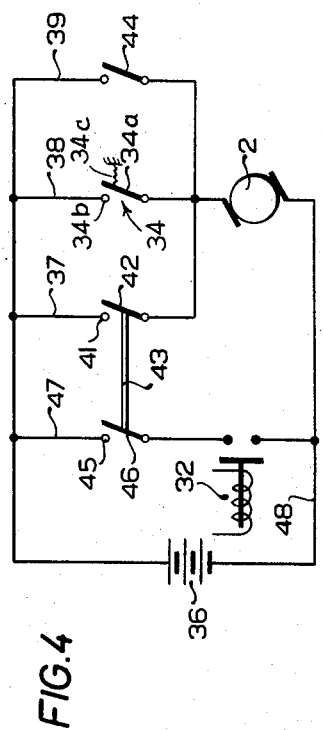
FIG. 4 is a diagram showing the electric circuit of the windshield wiper assembly.

The electric circuit of the motor 2 is shown in FIG. 4. This circuit includes a battery 36 or an analogous source of electrical energy, a manually operable starter switch or master switch 43 which controls two movable contacts 42, 46 respectively cooperating with fixed contacts 41, 45. The electromagnet 32 is connected in parallel with the battery 36 and in series with the contacts 45, 46, see the conductor 47. Three additional conductors 37, 38, 39 connect one pole of the battery 36 with the motor 2. The other pole of the battery 36 is connected with the motor by a conductor 48. The conductor 37 contains the contacts 41, 42; the conductor 38 contains the microswitch 34; and the conductor 39 contains a parking switch 44 which is closed and opened by the transmission 3 of the prime mover. A rotary worm wheel of the transmission 3 opens the parking switch 44 only when the wiper blade 15 reaches its outer end position, i.e., the parking switch 44 is closed in all other positions but the outer end position of the blade 15. It will be noted that the electromagnet 32 and the motor 2 are connected in parallel so that the motor 2 can run as long as the microswitch 34 and/or the parking switch 44 remains closed, even if the master switch 43 is open.

When the windshield wiper assembly is idle, the switches 43, 34 and 44 are open so that the circuit of the motor 2 is interrupted and the electromagnet 32 is deenergized. The wiper blades 15, 16 then assume their outer end positions and the pin 22 is located close to the right-hand end of the slot 21. In order to start the assembly, the operator closes the master switch 43 (this switch may resemble a pushbutton) so that the contacts 42, 46 respectively engage the contacts 41, 45. The circuit of the motor 2 is then completed through the conductor 37 and the motor drives the transmission 3 so that the arm 4 reciprocates the pushers 5 and 7 whereby the pusher 5 immediately begins to rock the crank arm 6 to move the wiper blade 15 from the outer end position. The circuit of the electromagnet 32 is completed through the conductor 47 so that the electromagnet attracts its armature 33 and the latter is withdrawn from the path of the trip 31 on the pawl 23. The wiper blade 15 reaches its inner end position 15' when the arm 4 completes one-half of a full revolution. During such phase of operation of the wiper blade 15, the other wiper blade 16 remains in its outer end position. However, the pusher 7 begins to move in a direction to the right, as viewed in FIG. 2, and moves its internal end face 28 toward the pin 22 whereby the pin engages the cam face 30 and rocks the pawl 23 against the bias of the spring 26. When the end face 28 moves into immediate proximity of the pin 22, the spring 26 returns the pawl 23 to the position shown in FIG. 2 and thereby couples the crank arm 8 to the pusher 7. This takes place when the arm 4 of the transmission 3 has completed one-half of a first revolution, i.e., when the wiper blade 15 already assumes the position 15'. When the pusher 7 begins its first leftward stroke, the pin 22 is entrained by the locking face 29 of the pallet 23c so that the crank arm 8 rocks the arm 14 to move the wiper blade 16 from the outer end position while the other blade 15 begins to move away from the inner end position 15'. In response to further rotation of the arm 4, the pushers 5 and 7 move back and forth to rock the wiper blades to and from the inner end positions 15', 16' but always in such a way that the blade 16 assumes the position 16' when the blade 15 assumes the outer end position, or vice versa. In other words, the two blades cannot interfere with each other because the blade 16 trails the blade 15 by one-half of a full cycle. During movement of the pusher 7 in a direction to the right (as viewed in FIG. 2), the pin 22 is entrained by the internal end face 28; however, when the pusher 7 moves in a direction to the left, the pin 22 is entrained by the locking face 29 of the pallet 23c. The switches 34, 44 open when the wiper blades 16, 15 respectively assume their outer end positions but these switches remain closed at all other times. However, such opening and closing of the switches 34, 44 cannot influence the operation of the motor 2 because the circuit of the motor remains completed through the conductor 37 (contacts 41, 42).

If the operator wishes to arrest the windshield wiper assembly, the master switch 43 is moved to open position to thereby disengage the contacts 42, 46 from the contacts 41, 45. This interrupts the flow of electric current through the conductors 37, 47 so that the electromagnet 32 is deenergized and the armature 33 immediately moves to the extended position of FIG. 3 and projects into the path of the trip 31 on the pawl 23. The motor 2 continues to run until the switches 34, 44 open in response to movement of wiper blades 16, 15 to their respective outer end positions. In order to make sure that the assembly comes to a complete standstill when each of the wiper blades 15, 16 returns to its respective outer end position, one of the blades must be arrested ahead of the other blade since the blade 15 reaches its outer end position when the blade 16 is in the inner end position 16' and vice versa. Such staggered (non-simultaneous) termination of movement of the blades 15, 16 is brought about by the improved coupling device in the following manner:

When the operator opens the master switch 43 and thus deenergizes the electromagnet 32, the armature 33 extends into the path of the trip 31 and rocks the pawl 23 as soon as the pusher 7 reaches its right-hand end position (i.e., that position which is directly opposite the position shown in FIG. 2). This opens the microswitch 34 in the conductor 38 because the movable contact 34a of the microswitch is opened by the pin 22 in the position shown in FIG. 2; however, the parking switch 44 remains closed so that the circuit of the motor 2 remains completed through the conductor 39. The lifted pallet 23c of the pawl then allows the pusher 7 to move with reference to the crank arm 8 whereby the pin 22 merely slides in the slot 21. The motor 2 comes to a halt when the pusher 7 reaches the position shown in FIG. 2 because the wiper blade 15 then assumes its outer end position and the worm wheel of the transmission 3 opens the parking switch 44.

It will be seen that the pawl 23 is disengaged from the pin 22 when the pusher 7 moves in a direction to the right, as viewed in FIG. 2, so that the pin bears against the end face 28. This means that the pawl 23 is subjected only to such stresses which are transmitted by the spring 26 and, therefore, the pawl can be readily swung to inoperative position with a minimal force. At the time the pawl 23 moves to operative position to engage the pin 22, the pusher 7 is again at a speed which is zero or approaches zero so that the transmission of motion from the pusher 7 to the crank arm 8 and hence to the blade 16 takes place practically without any shock. All parts of the improved assembly are relatively simple and inexpensive and will operate properly even if not machined with utmost precision.

In conventional windshield wiper assemblies of the class to which the assembly of my present invention belongs, the coupling device is provided between two rotary parts of the prime mover. One such rotary part must be moved axially into and out of engagement with the other rotary part. Such coupling devices can be actuated only by exertion of a considerable force, particularly when the one rotary part is to be disengaged from the other rotary part, because the disengagement must take place against the action of considerable frictional forces. Also, known coupling devices of the type which are installed in the transmission of the prime mover are rather complicated, bulky and expensive so that they contribute considerably to the initial cost of the assembly. Furthermore, the construction of prime movers with built-in coupling devices deviates greatly from the construction of mass-produced prime movers for windshield wiper assemblies; therefore, the remaining parts of the assembly, too, must be modified or replaced if the assembly is to be equipped with a prime mover having a built-in coupling device.

All such drawbacks of heretofore known windshield wiper assemblies are overcome by the provision of my improved coupling device which can be installed in assemblies utilizing conventional prime movers because the coupling device is not built into the prime mover. The movements of the motion transmitting pawl 23 to and from operative position may be carried out by exertion of minimal forces, i.e., in response to pressure exerted by the pin 22 against the cam face 30 of the pallet 23c, by the bias of the spring 26, or by engagement of the trip 31 with the armature 33 of the electromagnet 32. As mentioned hereinabove, the pin 22 is disengaged from the pallet 23c at a time when it bears against the end face 28 of the pusher 7 so that the movement of the pawl to inoperative position in order to release the pin takes place as soon as the armature 33 overcomes the bias of the spring 26.

The improved coupling device may be used with advantage in assemblies wherein the wiper blade 16 is to be periodically operated and idled, i.e., wherein two or more wiper blades operate intermittently at selected intervals.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a windshield wiper assembly for automotive vehicles, a wiper blade rockable about a fixed axis; a crank arm connected with said wiper blade and rockable therewith about said fixed axis; a prime mover; and coupling means for selectively connecting said prime mover with said crank arm, including a reciprocable element operatively connected with said prime mover and having an elongated slot, a projection provided on said crank arm and reciprocably extending into said slot, a motion transmitting member mounted on said element for movement between an operative position in which it engages said projection to thus couple the crank arm to said element whereby the crank arm rocks about said fixed axis in response to reciprocation of said element and an inoperative position in which said projection is free to slide in said slot so that said element may reciprocate with reference to said crank arm, and manually controlled disengaging means for moving said motion transmitting member to inoperative position.

2. A structure as set forth in claim 1, wherein said projection is arranged to temporarily move said motion transmitting member to inoperative position in response to movement of said element with reference to said projection, and further comprising means for permanently biasing said motion transmitting member to operative position.

3. A structure as set forth in claim 1, wherein said disengaging means comprises an electromagnet having an armature which extends into the path of and trips said motion transmitting member in response to deenergization of said electromagnet.

4. A structure as set forth in claim 1, wherein said motion transmitting member comprises a pawl which is rockable between said operative and inoperative positions thereof and normally assumes said operative position, said disengaging means comprising an actuating member movable into the path of movement of said pawl to thereby rock the pawl to said inoperative position.

5. A structure as set forth in claim 4, wherein said pawl is rockable about a second axis located in a plane which halves and extends lengthwise of said slot, said element having an internal end face bounding one end of said slot and abutting against said projection when the latter is engaged by said pawl.

6. A structure as set forth in claim 5, wherein said second axis is closely adjacent to said internal end face.

7. A structure as set forth in claim 4, wherein said pawl is provided with cam face which is inclined with reference to the longitudinal direction of said slot and against which said projection abuts to thereby rock the pawl to said inoperative position in response to starting of said prime mover and resultant movement of said element with reference to said projection, and further comprising means for biasing the pawl to said operative position so that the pawl engages the projection as soon as the latter moves beyond said cam face.

8. A structure as set forth in claim 7, wherein said pawl comprises a pallet which is provided with said cam face, said pallet further comprising a locking face which engages the projection when the latter advances beyond said cam face.

9. A structure as set forth in claim 8, wherein said element is provided with an internal end face bounding one end of said slot, said projection abutting against said end face and against said locking face when the pawl couples said crank arm to said element.

10. A windshield wiper assembly for automotive vehicles, comprises a pair of wiper blades each rockable about a fixed axis between an inner end position and an outer end position; a prime mover including a rotary output member; a pair of crank arms each rigid with one of said blades and each rockable about one of said axes; a first pusher connected with said output member for reciprocation in response to rotation of said output member; pivot means connecting said pusher with one of said crank arms to rock the respective blade in response to reciprocation of said pusher; and coupling means for selectively connecting said output member with the other crank arm so as to rock the corresponding blade in response to rotation of said output member, said coupling means comprising a second pusher connected with said output member for reciprocatory movement in response to rotation of said output member and having an elongated slot, a projection provided on said other crank arm and reciprocably extending into said slot, a motion transmitting member mounted on said second pusher for movement between an operative position in which it engages said projection to thus couple said other crank arm to said second pusher and an inoperative position in which said projection is free to slide in said slot so that the second pusher may reciprocate with reference to said other crank arm, and manually controlled disengaging means for moving said motion transmitting member to inoperative position.

11. A windshield wiper assembly as set forth in claim 10, wherein one of said blades sweeps an area of the windshield which overlaps a portion of the area swept by the other blade when said blades are caused to rock between said inner and outer end positions thereof.

12. A windshield wiper assembly as set forth in claim 11, wherein the length of said slot is such that the projection of said other crank arm is accommodated in one end portion of said slot when said motion transmitting member couples the projection to said second pusher and wherein said projection is arranged to temporarily move said motion transmitting member to inoperative position in response to movement of said second pusher with reference to said other crank arm.

References Cited

UNITED STATES PATENTS 2,654,907   10/1953   Allen _____ 15—250.14

FOREIGN PATENTS 812,034   8/1951   Germany.

CHARLES A. WILLMUTH, *Primary Examiner.*